June 2, 1964 J. B. DAHMS ETAL 3,135,501
IN SITU POTASSIUM CHLORIDE RECOVERY BY SELECTIVE SOLUTION
Filed May 1, 1962
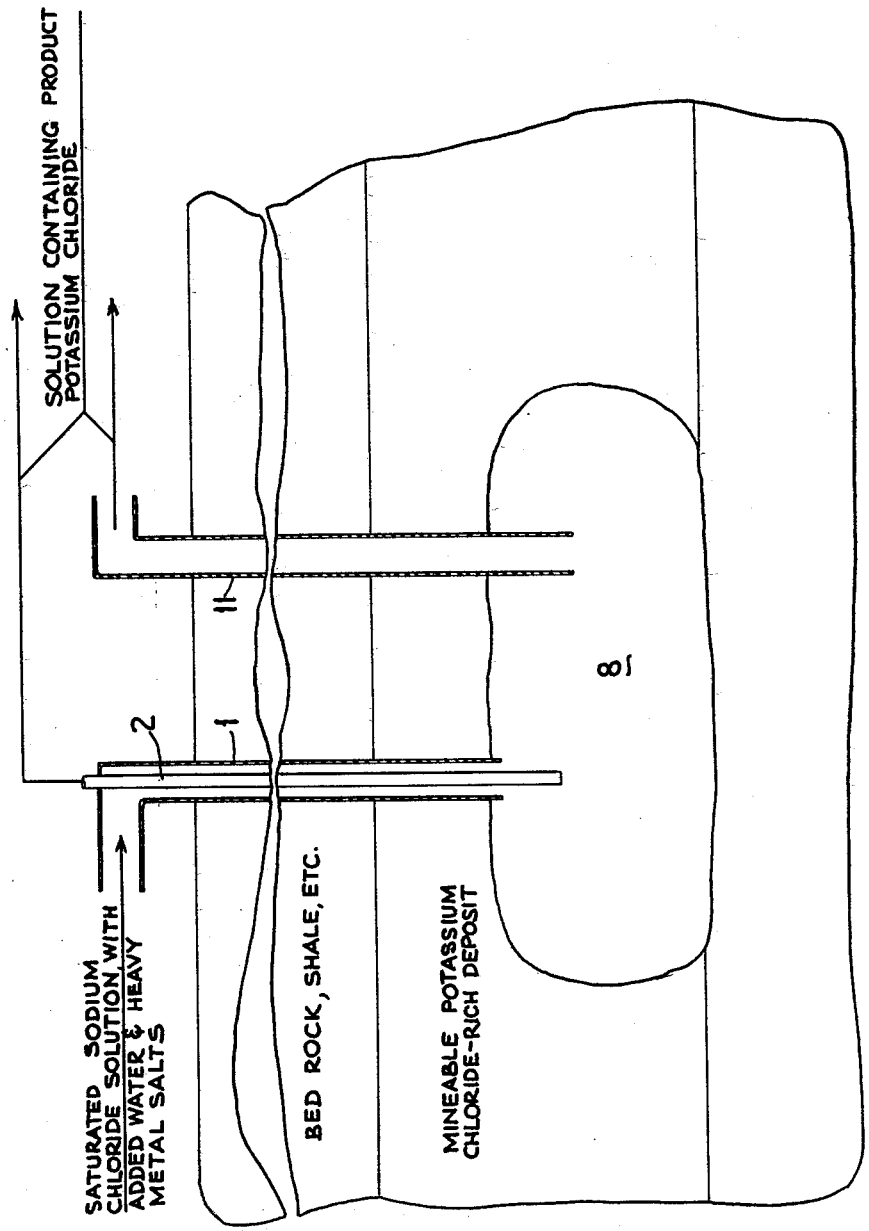
INVENTORS
JAMES BOWEN DAHMS and
BYRON PRIESTLY EDMONDS
BY
Oscar L. Spencer
ATTORNEY 3,135,501
IN SITU POTASSIUM CHLORIDE RECOVERY
BY SELECTIVE SOLUTION
James Bowen Dahms, Corpus Christi, and Byron Priestly Edmonds, Alice, Tex., assignors to Pittsburgh Plate Glass Company, Pittsburgh, Pa., a corporation of Pennsylvania
Filed May 1, 1962, Ser. No. 191,458
7 Claims. (Cl. 262—3)

This invention relates to a novel process for the recovery of potassium chloride from subterranean deposits.

Potassium chloride usually occurs in mineral deposits closely associated with sodium chloride. In many cases, potassium chloride exists in admixture or in combination with sodium chloride in the form of a potassium chloride-rich strata, containing 15 to 60 percent by weight of KCl based upon the total weight of KCl and NaCl in the strata. These mineral deposits usually contain other materials, generally clay and salts such as calcium sulphate, magnesium sulphate and the like in small quantities, typically about 2 to 15 percent.

Subterranean deposits of potassium chloride and sodium chloride of this type frequently are very deep. For example, Canadian deposits of this character are often found 3,000 feet or more below the surface of the ground.

Heretofore, recovery of potassium chloride by extracting deposits of potassium chloride from subterranean resources with water has not been of commercial importance. Various problems are encountered, such as difficulty in establishing a proper cavity because of the slow rate of extraction of KCl from the deposit due to the inherent sodium chloride crystallization on the interior surface of the cavity walls.

This difficulty is minimized by the process of this invention which involves sinking a cased bore hole into a potassium chloride-rich deposit (wherein the potassium chloride contents is 15 to 60 percent based upon the weight of KCl and NaCl in the deposit) and introducing to the deposit an aqueous saturated NaCl solution, typically at above about 100° F., preferably above 140° F., containing NaCl in amounts of at least 95.0 percent, preferably above 97 percent, by weight of the saturation point of the solution. Preferably, this solution should not have a KCl content in excess of 50 percent, preferably less than 10 percent, by weight of the KCl saturation point of the NaCl-containing solution. To this saturated solution is added certain heavy metal salts which in combination with the saturated condition and temperature of the solution is found to favor the recovery of KCl from the deposit to the substantial exclusion of NaCl.

Heavy metals included within the purview of this invention are those of groups IV(A), V(A), VIII and II(B) of the periodic chart of the elements found at pages 58 and 59 of Lange's Handbook of Chemistry, Sixth Edition (1946) published by Handbook Publishers, Inc., Sandusky, Ohio. The heavy metals of the aforementioned groups of said periodic chart are, respectively: in group IV(A), germanium, tin and lead; in group V(A), antimony and bismuth; in group VIII, iron, cobalt, nickel, platinum, iridium, osmium, ruthenium, rhodium and palladium; and in group II(B), zinc, cadmium and mercury. The heavy metal salts employed in this invention may be in the form of, e.g., the chloride, sulphate, carbonate, iodide, bromide and acetate.

When these salts are added to the hot solution employed for extraction purposes in amounts of from 0.0001 to 1.0, preferably from 0.001 to 0.003 gram moles of heavy metal ion per 1,000 grams of water in said solution, most effective rates of recovery of potassium chloride are obtainable.

To obtain optimum yields of potassium chloride from KCl-rich deposits it is desirable to employ the aforementioned heavy metal salts in the prescribed heated aqueous solution. If the metal salts are not employed yet the prescribed solution is fed to the deposit at the prescribed temperature, it is found that less than optimum yields of potassium chloride from the deposits is achieved. When the heavy metal salts are added to the heated or unheated solution, an increased yield of potassium chloride is immediately noticeable. On the other hand, utilization of solution at temperatures below 100° F. is found to reduce the effectiveness of the saturated solution containing heavy metal salts in extracting potassium chloride from the deposit. Because of handling difficulties and heating costs, the saturated solution will seldom be employed over its boiling point.

It will be understood that in selectively extracting KCl from a deposit containing KCl and NaCl, the rate of solution of potassium chloride is comparatively slow. For example, it is frequently found that this rate is in the range of 0.01 pound per hour per square foot extracting surface at a practical operating temperature, for example, at 110° F. This means that the extraction of enough potassium chloride to develop a cavity to the point where practical recovery of potassium chloride can be effected is an extremely slow and difficult problem. In most cavities it can become so slow that after a short time, any extraction that does take place in the deposit essentially ceases as far as obtaining product KCl in the recovery step. This is caused by cavity surface accumulation of a crystalline deposit rich in NaCl which hinders the passage of water to the underlying layer of KCl. It has been found that in utilizing heavy metal salts in combination with saturated sodium chloride solution at above about 100° F., the formation of a sodium chloride crystal facing on the interior wall of the cavity is repressed thereby allowing satisfactory penetration of the solution to effect contact with KCl contained within said deposit.

Of the heavy metal salts described above, it has been found that cadmium, lead, bismuth, iron, cobalt and nickel salts appear to assert the most positive effect in the operation of this process. Of the salts, it is most preferred to use the chloride, nitrate, and acetate forms. Thus, cadmium chloride, lead acetate, bismuth chloride, iron chloride, cobalt nitrate and nickel chloride have been found most effective in the operation of this process.

Illustrative of the results of this invention is the following experiment which depicts effects obtained in extracting KCl from a KCl ore sample using a heated aqueous saturated NaCl solution containing heavy metal ions:

Two containers, each containing aqueous saturated sodium chloride solution, were heated to the temperature indicated in the table below. To one of the containers was introduced lead nitrate in an amount sufficient to give the lead ion concentration indicated in the table below. No heavy metal ion was added to the other container. To each container was immersed a core of potassium chloride-rich ore having the potassium chloride assay, in weight percent basis weight of ore, listed in the table below. The following results were obtained when the temperature of the solution in each container was maintained at 122° F. and the experiment repeated at 199.4° F.

[At 122° F.]

| Amount of Pb++ added—grams of Pb++ per liter of NaCl solution | Core assay weight percent KCl | Immersion time (hours) of core in solution | Penetration of ore by solution (inches) | Dissolving rate pounds/ square foot KCl/hour |
|---|---|---|---|---|
| 1. None | 41.0 | 87.83 | 0.63 | 0.112 |
| 2. 4.5 | 31.8 | 16.25 | 0.28 | 0.406 |

[At 199.4° F.]

| | | | | |
|---|---|---|---|---|
| 3. None | 44.04 | 1.33 | 0.27 | 2.194 |
| 4. 4 | 30.03 | 1.33 | 0.50 | 3.959 |

The accompanying drawing diagrammatically illustrates a typical embodiment of this invention. The drawing shows a typical cavity with two communicating bore holes.

As illustrated by the drawing, a cased bore hole 1 is first drilled into the deposit. To the interior of this hole is fitted a pipe 2 centrally positioned therein so that saturated solution can be fed exterior of the pipe through the annular space within the cased bore hole. The sodium chloride solution is fed to the annular space exterior of the pipe to effect contact with the deposit. The solution is recirculated up the interior pipe to be removed and treated for recovery of potassium chloride products. This procedure is continued until the cavity 8 has a radius emanating from the bore hole for a distance generally greater than 10 feet, preferably greater than 20 feet.

After development of the cavity 8 there may be introduced a withdrawal cased bore hole 11 which effects open communication with the cavity and the initial bore hole 1. Thereupon the pipe 2 is removed within the initial bore hole 1 and saturated solution at a temperature greater than 140° F. containing the prescribed amount of heavy metal salts is continuously fed thereto. Solution is removed from said cavity through the withdrawal hole 11 after which it is treated by known procedures to effect recovery of potassium chloride product.

A significant advantage of this process is that only the potassium chloride need be removed from the aqueous solution recovered from the cavity. As a result thereof, the saturated sodium chloride solution may be recycled from the recovery step while still containing the aforementioned heavy metal salts. The latter salts are maintained at a constant level throughout processing and may be re-introduced to the introduction hole for further extraction purposes.

As the size of the cavity increases, it is necessary to add water to the recycled solution to compensate for the volume of salts removed from the formation and incorporated therein.

Though not desiring to be held to any specific theory regarding the operation of the process of this invention, it is felt that instead of completely dissolving away the total face of the cavity in order to effect extraction of the salts contained therein, the heated solution only extracts potassium chloride while leaving a porous matrix of sodium chloride in the interior of the cavity. As the size of the cavity is increased concurrent with the increased flow rates of solution, this porous matrix continuously collapses. This causes the deposition of sodium chloride to the bottom of the cavity and only a porous spongy network of NaCl is left on the wall of the cavity. This network of NaCl does not repress contact of the solution with the KCl-containing deposit.

Moreover, by leaving the sodium chloride in the deposit, it is possible after total depletion of potassium chloride to redissolve this sodium chloride as product for independent recovery thereby providing sequential extraction of potassium chloride followed by extraction of sodium chloride. This allows for the recovery of a relatively pure material heretofore unattainable by other techniques.

The amount of the aforementioned solution added to the cavity is dependent upon the cavity size, the flow rates desired within the cavity and the size of the deposit in which extraction is proceeding.

The procedures employed for drilling bore holes to the deposit, forming the deposit and connecting an introduction and withdrawal hole, when a plurality of holes are employed, are well known and the invention herein discussed is not considered limited to these techniques. Another technique for forming this cavity involves the well-known method of hydraulic fracturing, after which the fracture is attacked by the saturated aqueous solution having a temperature above about 140° F. and containing the aforementioned heavy metal salts.

Though the invention has been described above with regard to specific details, the invention is not limited thereto except insofar as these details are recited in the claims.

We claim:

1. In the process of selectively extracting potassium chloride from a subterranean deposit containing potassium chloride and sodium chloride, the improvement which comprises feeding to said deposit a saturated aqueous solution of sodium chloride while above about 100° F. and containing from 0.0001 to 1.0 gram-moles of the heavy metal ion of a salt of a heavy metal from the class consisting of groups IV(A), V(A), VIII and II(B) of the periodic chart of elements per 1000 grams of water in said aqueous solution, removing potassium chloride with said solution from the deposit and recovering potassium chloride from said solution.

2. In the process of selectively extracting potassium chloride from a subterranean deposit containing potassium chloride and sodium chloride, the improvement which comprises feeding to said deposit a saturated sodium chloride solution while above about 100° F. and containing a salt of a heavy metal, in an amount from 0.0001 to 1.0 gram mole of the metal ion per 1,000 grams of water in said solution, from the class consisting of groups IV(A), V(A), VIII and II(B) of the periodic chart of elements through an introduction bore hole openly communicating with said deposit, forming a cavity by circulating said solution in said deposit, and removing said solution containing potassium chloride therefrom, communicating a withdrawal hole with said cavity so that said introduction hole and said withdrawal hole are openly connected through said cavity, and removing said heated solution containing said heavy metal and potassium from said cavity through said withdrawal hole.

3. In the process of selectively extracting potassium chloride from a subterranean deposit containing potassium chloride and sodium chloride, the improvement which comprises feeding to said deposit a saturated sodium chloride solution at above about 140° F. and containing a heavy metal salt, in an amount from 0.001 to 0.003 gram mole of the metal ion per 1,000 grams of water in said solution, from the class consisting of salts of the metals of groups IV(A), V(A), VIII and II(B) of the periodic chart of elements, removing potassium chloride from the deposit in a mixture with said solution and recovering potassium chloride therefrom.

4. In the process of claim 3 wherein the heavy metal salt is lead acetate.

5. In the selective extraction of potassium chloride from a subterranean deposit containing potassium chloride and sodium chloride to produce a potassium chloride solution in a cavity in said deposit the improvement which comprises adding to the solution in the cavity from 0.0001 to 1.0 gram-mole of the heavy metal ion of a salt of a metal of the group consisting of the heavy metals of groups IV(A), V(A), VIII and II(B) per 1000 grams of water in said solution.

6. The process of claim 5 wherein said amount of said salt is 0.001 to 0.003 mole of heavy metal ion to 1,000 grams of water in said solution.

7. The process of claim 5 wherein the salt is a member of the group consisting of chlorides, nitrates and acetates.

References Cited in the file of this patent
UNITED STATES PATENTS 2,161,800   Cross _____ June 13, 1939